(12) United States Patent
Meysenc et al.

(10) Patent No.: US 12,531,186 B2
(45) Date of Patent: Jan. 20, 2026

(54) ELECTRICAL SUPPLY SYSTEM

(71) Applicant: Schneider Electric Industries SAS, Rueil Malmaison (FR)

(72) Inventors: Luc Meysenc, Mens (FR); Eric Brun, Sassenage (FR)

(73) Assignee: Schneider Electric Industries SAS, Rueil Malmaison (FR)

(*) Notice: Subject to any disclaimer, the term of this patent is extended or adjusted under 35 U.S.C. 154(b) by 898 days.

(21) Appl. No.: 17/834,011

(22) Filed: Jun. 7, 2022

(65) Prior Publication Data
US 2022/0415570 A1    Dec. 29, 2022

(30) Foreign Application Priority Data

Jun. 29, 2021  (FR) .................................. FR2106986

(51) Int. Cl.
*H01F 38/14*    (2006.01)
*H01F 27/28*    (2006.01)

(52) U.S. Cl.
CPC ............. *H01F 38/14* (2013.01); *H01F 27/28* (2013.01)

(58) Field of Classification Search
CPC .. H01F 38/14; H01F 27/28; H02J 1/14; H02J 2310/16; H02J 3/26; H02J 3/00; H02M 1/0074; H02M 5/14; H02M 7/04
See application file for complete search history.

(56) References Cited

U.S. PATENT DOCUMENTS

| | | | |
|---|---|---|---|
| 10,742,123 B1 | 8/2020 | Sigamani | |
| 10,981,667 B2 | 4/2021 | Knope et al. | |
| 2013/0162042 A1 | 6/2013 | Phadke et al. | |
| 2021/0135486 A1* | 5/2021 | Liu ....................... | H02M 1/325 |

FOREIGN PATENT DOCUMENTS

| | | | |
|---|---|---|---|
| JP | 11266586 A | * | 9/1999 |
| JP | H11266586 A | | 9/1999 |

OTHER PUBLICATIONS

French Search Report and Written Opinion dated Mar. 11, 2022 for corresponding French Patent Application No. FR2106986, 7 pages.

* cited by examiner

*Primary Examiner* — Lincoln D Donovan
*Assistant Examiner* — Alex W Lam
(74) *Attorney, Agent, or Firm* — Quinn IP Law

(57) ABSTRACT

An electrical supply system, suitable for supplying a plurality of separate loads from one AC source, including at least two single-phase or multi-phase electrical transformers, each including one primary induction circuit and one secondary induction circuit. The primary induction circuits are connected in series forming a succession of transformers. For each of the transformers, the secondary induction circuit includes at least two groups of secondary windings, each group of secondary windings having at least one group of output terminals. One of the groups of output terminals is connected to at least one of the loads to be supplied, and another of the groups of output terminals is connected to one of the groups of output terminals of another transformer in the succession of transformers, so as to achieve a parallel connection of the secondary induction circuits.

10 Claims, 5 Drawing Sheets

ELECTRICAL SUPPLY SYSTEM

TECHNICAL FIELD

The present invention relates to an electrical supply system suitable for supplying a plurality of separate loads.

The invention lies in the field of electrical supply and finds applications in particular in supplying electricity to data centres or server clusters, which are high-power-consuming systems.

The invention also finds applications in lower-power electrical distribution systems, such as supplying power to connected objects (IoT).

BACKGROUND

Supplying electricity for installations comprising a large number of loads which consume a lot of power poses problems. This is the case, for example, for a data centre and/or computing centre which comprises a large number of storage and computing devices (e.g. printed circuit boards) comprising electronic memories and computing processors, these devices being organized in racks, each rack being able to comprise many thousands of storage and computing devices and being likely to consume of the order of 5 to 50 kW per rack. Thus, the total electrical power to be supplied may exceed 100 MW. In this example, the loads which are printed circuit boards have to be supplied with direct current, while the source of electrical current (e.g. the electricity grid) supplies an alternating current; therefore conversion systems, e.g. transformers and converters, are required. Supplying electricity poses problems in such an application because of the length of power transmission cable, a large number of power trains, a complex architecture integrating a plurality of stages of transformers/converters and of switches in order to ensure a DC electricity distribution from an AC source, which is reliable and secure.

Similar problems arise for supplying electricity for other industrial installations comprising numerous loads that are likely to consume a high electrical power.

SUMMARY

One of the objectives of the invention is to propose an electrical supply system which has a simplified architecture compared to known systems, thus making it possible to save resources.

To this end, the invention proposes an electrical supply system suitable for supplying a plurality of separate loads from one AC power supply source, comprising at least two single-phase or multi-phase electrical transformers, each electrical transformer comprising one primary induction circuit comprising a group of primary windings, and one secondary induction circuit comprising at least one group of secondary windings. The primary induction circuits of said transformers are connected in series forming a succession of transformers. For each of the transformers, the secondary induction circuit comprises at least two groups of secondary windings, each group of secondary windings having at least one group of output terminals, each group of terminals consisting of one terminal per phase. One of said groups of output terminals is connected to at least one of the loads to be supplied, and another of said groups of output terminals is connected to one of the groups of output terminals of another transformer in the succession of transformers, so as to achieve a parallel connection of the secondary induction circuits.

Advantageously, the proposed system allows electricity to be distributed to a plurality of loads, with a simplified and modular architecture, the loads being able to be dispersed over a large area.

Advantageously, by virtue of the proposed system architecture, the secondary induction circuits of the transformers are connected in a specific way which allows balancing of the voltages and currents at the input and at the output of the transformers independently of the power consumed by the loads supplied on each transformer.

The electrical supply system according to the invention may also have one or more of the features below, taken independently or in any technically possible combination.

For each transformer, each group of secondary windings comprises windings with the same winding direction.

The system comprises multi-phase electrical transformers, and for each transformer, the primary induction circuit comprises a group of primary windings comprising at least one primary winding per phase, and said primary windings are connected in series per phase.

The system comprises multi-phase electrical transformers, the connections of groups of terminals are made according to a multi-phase connection mode chosen from a star connection, a polygonal connection or a combination of these connection modes.

For each transformer, the secondary induction circuit comprises a group of main windings connected to a load to be supplied, and a group of auxiliary windings comprising a group of input terminals and a group of output terminals, and the terminals of the group of input terminals of each secondary induction circuit are connected in parallel, and the terminals of the group of output terminals of each secondary induction circuit are connected in parallel.

The terminals of the group of input terminals of each secondary induction circuit are connected, per phase, to one and the same group of conductors, and the terminals of the group of output terminals of each secondary induction circuit are connected, per phase, to one and the same group of conductors.

For each transformer, the secondary induction circuit comprises a group of main windings connected to a load to be supplied, and a group of auxiliary windings, each group of windings having a group of input terminals and a group of output terminals, each terminal of the group of input terminals of a group of auxiliary windings being connected, per phase, to a terminal of the group of input terminals of the group of main windings of the secondary induction circuit of a following or preceding transformer of the succession of transformers, and each terminal of the group of output terminals of a group of auxiliary windings being connected, per phase, to a terminal of the group of output terminals of said group of main windings.

The system comprises at least three electrical transformers, each electrical transformer comprising a secondary induction circuit comprising at least three groups of secondary windings, comprising a group of main windings connected to a load to be supplied, and two groups of auxiliary windings, each group of auxiliary windings having a group of input terminals and a group of output terminals, and a first group of auxiliary windings of a secondary induction circuit of a transformer is connected in parallel, via said groups of input and output terminals, to a group of main windings of a following or preceding transformer of the succession of transformers.

For a transformer under consideration of index n of the succession of transformers, the group of output terminals of the first group of auxiliary windings is connected to the group of output terminals of the group of main windings of a transformer of index n+1 in the succession of transformers, and the group of output terminals of the second group of auxiliary windings is connected to the group of output terminals of a second group of auxiliary windings of a transformer of index n+2 in the succession of transformers.

The system further comprises an AC-to-DC converter connected between a group of secondary windings and a load to be supplied.

BRIEF DESCRIPTION OF THE DRAWINGS

Other features and advantages of the invention will emerge from the description thereof given below, by way of non-limiting indication, with reference to the appended figures, in which.

DETAILED DESCRIPTION

Figure 1:
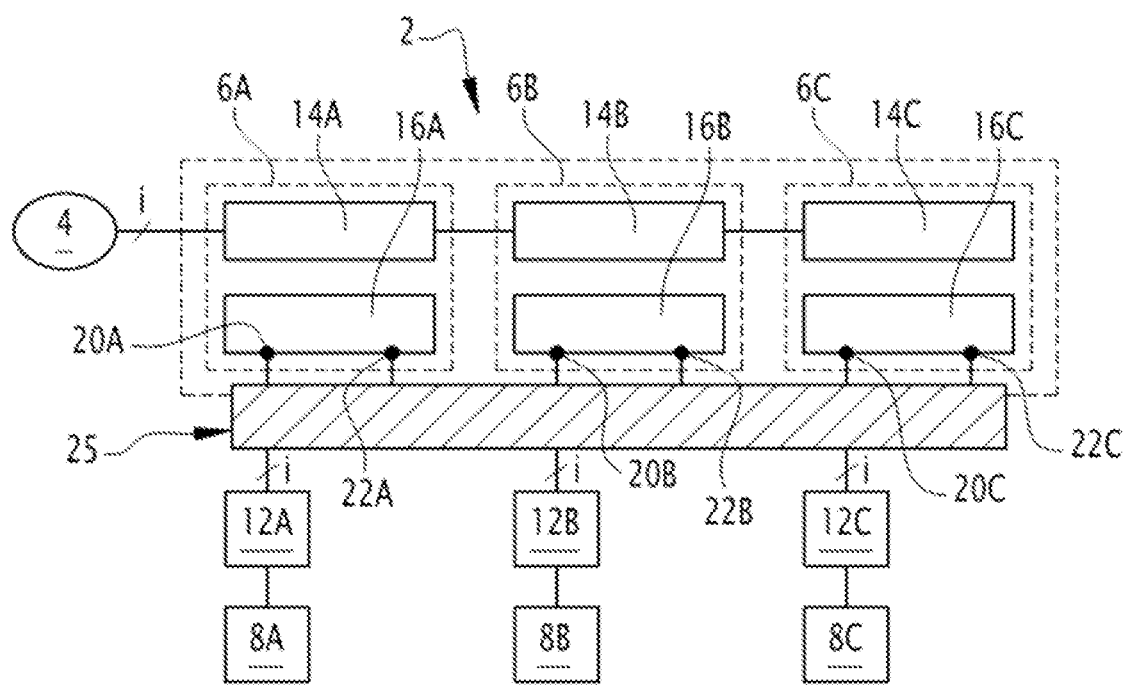
FIG. 1 is a generic architecture of an electrical supply system according to the invention.

FIG. 1 schematically depicts a generic architecture of a power supply system as proposed.

The power supply system 2 is connected to an electrical supply source 4 (or electrical power source), for example a multi-phase distribution network, generally a three-phase distribution network, supplying three voltage phases or, according to one variant, a single-phase distribution network.

To simplify the depiction and with no loss of generality, the figures schematically illustrate connections to a wire with an indication of a number i of phases, i being greater than or equal to 1, to depict both single-phase connections (i=1) and multi-phase connections (i>1).

In the example schematically illustrated, the system 2 comprises three electrical transformers, with the references 6A, 6B, 6C, respectively, configured to deliver power to three separate loads 8A, 8B, 8C.

Each electrical transformer is, in a known manner, suitable for changing the values of voltage and of current intensity delivered by an AC power source into different values of voltage and of current, having the same frequency, that of the distribution network, and having the same shape.

In the example of FIG. 1, each load 8A, 8B, 8C is connected to an AC-to-DC converter (also called a rectifier) 12A, 12B, 12C, suitable for transforming an alternating voltage into a direct voltage.

Each electrical transformer 6A, 6B, 6C comprises one primary induction circuit 14A, 14B, 14C and one (single-phase or multi-phase, for example three-phase) secondary induction circuit 16A, 16B, 16C.

Each primary induction circuit comprises, in a known manner, a group of primary windings comprising one or more windings per phase, or electrical induction coils consisting of a conductive wire wound around a magnetic core.

The primary induction circuits 14A, 14B, 14C are daisy-chained in series on each of the phases, thus forming an electrical circuit connected to the electrical supply source 4.

The electrical transformers connected in series by the primary induction circuits form a succession of transformers, respectively comprising in the example a first transformer 6A, a second transformer 6B and a third transformer 6C.

Of course, the number of electrical transformers is not limited to three; generally an electrical supply system 2 comprises a number N of electrical transformers, N being a positive integer greater than or equal to two.

Each secondary induction circuit 16A, 16B, 16C comprises at least two groups of secondary windings (not depicted in FIG. 1), according to various embodiments described in more detail hereinbelow. Each group of secondary windings comprises at least one winding (or coil) per phase.

Each secondary induction circuit 16A, 16B, 16C comprises at least two groups of connection terminals 20A, 22A; 20B, 22B; 20C, 22C. Each group of connection terminals comprises one terminal per phase polarity.

At least one group of connection terminals 20A, 20B, 20C of each transformer 6A, 6B, 6C is connected to a corresponding load 8A, 8B, 8C, via the corresponding AC-to-DC converter 12A, 12B, 12C.

Moreover, an interconnection system 25 is implemented, allowing, via the connections between groups of connection terminals of the secondary induction circuits, a parallel connection between secondary induction circuits of at least two transformers of the succession of the transformers to be achieved.

Several embodiments of the interconnection system 25 are described hereinbelow.

Advantageously, the parallel connection of the secondary induction circuits of the electrical transformers allows balancing of the voltages supplied at the output by these electrical transformers to be achieved independently of the consumption of the electrical loads 8A, 8B, 8C supplied via the converters 12A, 12B, 12C, the loads not necessarily being interconnected directly with each another.

Several embodiments are described hereinbelow.

Moreover, as will be explained hereinbelow with reference to the embodiments, each secondary induction circuit comprises P groups of windings, P being greater than or equal to two, each group of windings comprising at least one winding per phase.

In the rest of the description, references which designate elements that have already been described with reference to FIG. 1 are retained.

Figure 2:
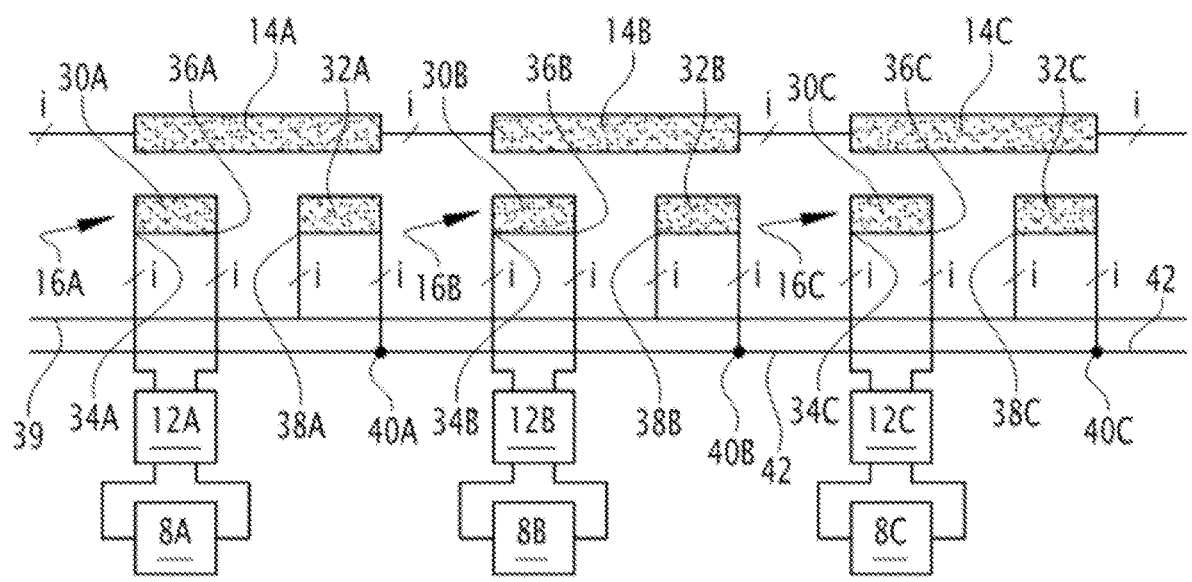
FIG. 2 is a schematic depiction of a first embodiment of an electrical supply system.

FIG. 2 illustrates a first embodiment of a power supply system according to the invention.

In this first embodiment, each secondary induction circuit 16A, 16B, 16C comprises two groups of separate secondary windings 30A, 32A; 30B, 32B; 30C, 32C, each group comprising at least one winding per phase.

Each secondary induction circuit comprises a group of main windings connected to the corresponding load, and a group of auxiliary windings.

Since each of these groups of secondary windings is multi-phase, the connections are made according to a multi-phase connection mode chosen from a star or delta connection (or a polygonal connection depending on the number of phases), or a zigzag connection, or any other combination of these connection modes that is of interest for the dimensioning of the installation.

Preferably, in each secondary induction circuit, for each phase, the two groups of windings comprise windings with the same direction, that is to say that the conductive wire is wound around a magnetic core in one and the same predetermined direction.

Preferably, all the windings of all the secondary induction circuits 16A, 16B, 16C of the power supply system are coiled in the same direction.

In this embodiment, the first group of main windings 30A, 30B, 30C of a secondary induction circuit comprises a group of input terminals 34A, 34B, 34C and a group of output terminals 36A, 36B, 36C connected to an AC-to-DC converter 12A, 12B, 12C.

Preferably, each main winding, for each phase, is configured to reduce the voltage to a level that is compatible with the voltage of the load, the AC-to-DC converter and to maximize the transfer of power to the load. The transformation ratio between the primary windings of the primary induction circuit and the main windings of the secondary induction circuit is chosen as a function of the overall voltage of the power supply system 2 and of the number N of transformer primaries in series.

The second group of secondary windings 32A, 32B, 32C, also called group of auxiliary windings, of a secondary induction circuit 16A, 16B, 16C comprises a group of input terminals 38A, 38B, 38C connected to a common point (schematically depicted in the figure by a group of conductors 39), and a group of output terminals 40A, 40B, 40C connected to a group of conductors 42. It is understood that when daisy-chained (i>1), each conductor 39, 42 is a group of conductors formed in fact of one conductor per phase. For example, the terminals corresponding to one and the same phase are connected to one and the same conductor, thus achieving a parallel connection.

Thus, in this embodiment, the terminals of the group of output terminals 40A, 40B, 40C of the secondary induction circuits are all connected in parallel, which allows the balancing of the voltages by the mutual inductances between all of the primary and secondary windings on one and the same phase of each of the transformers to be guaranteed. To the nearest approximation of the voltage drops in the parasitic inductances and in the cables, the voltages of all the windings of the power supply system are coupled by a constant ratio corresponding to the number of turns of each of the windings: primary, main secondary and auxiliary secondary.

Figure 3:
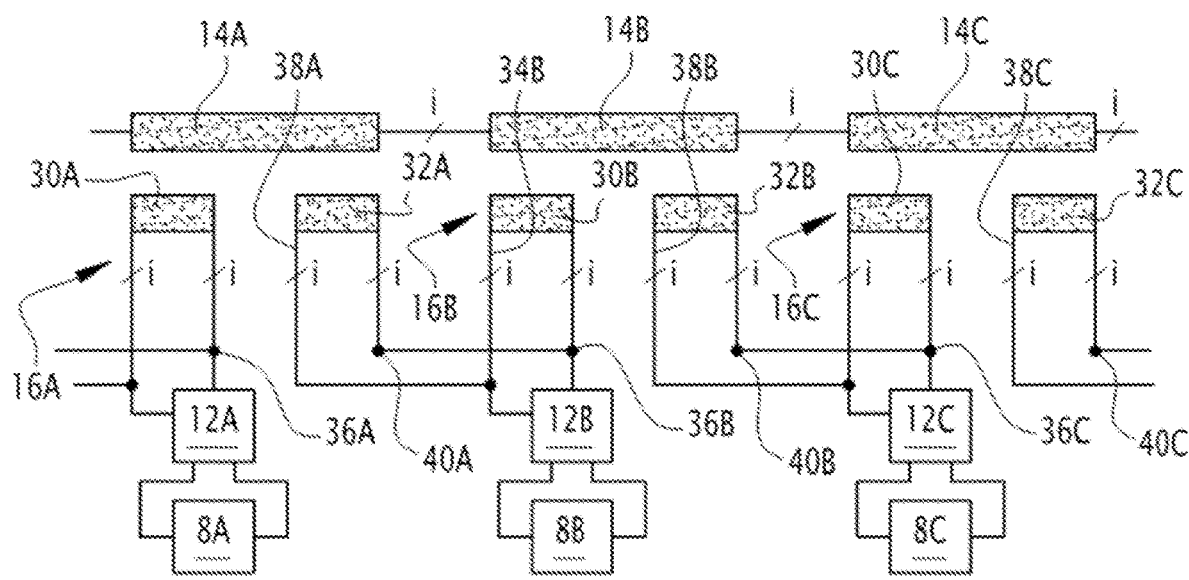
FIG. 3 is a schematic depiction of a second embodiment of an electrical supply system.

FIG. 3 illustrates a second embodiment of a power supply system according to the invention.

In this second embodiment, as in the first embodiment described with reference to FIG. 2, each secondary induction circuit 16A, 16B, 16C comprises two groups of separate windings 30A, 32A; 30B, 32B; 30C, 32C, respectively a group of main windings 30A, 30B, 30C and a group of auxiliary windings 32A, 32B, 32C.

In this second embodiment, each second group of auxiliary windings 32A, 32B, 32C comprises a group of input terminals 38A, 38B, 38C and a group of output terminals 40A, 40B, 40C, respectively connected to a common point with the groups of terminals 34B, 34C 34A and 36B, 36C, 36A, of the group of main windings of the following transformer in the succession of transformers.

By way of example, the group of terminals 38A of the second group of auxiliary windings 32A, of the secondary induction circuit 16A, is connected, via a chosen multi-phase connection mode, to the group of terminals 34B of the group of main windings 30B of the secondary induction circuit 16B; and the group of output terminals 40A of the second group of auxiliary windings 32A, of the secondary induction circuit 16A, is connected, via a chosen multi-phase connection mode, to the group of output terminals 36B of the group of main windings 30B of the secondary induction circuit 16B.

Thus, by way of the connection of the auxiliary secondary windings to the main secondary windings of other transformers, step by step, all being connected, a parallel connection between all the outputs of secondary induction circuits 16A, 16B, 16C (of one and the same phase) is achieved, specifically for an operation similar to what has been described for the first embodiment.

The number of groups of windings of the secondary induction circuit of each transformer is not limited to 2; it may be generalized to P, P being a positive integer greater than 2, as required, the number N of transformers of the system also being greater than or equal to P in this case.

Figure 4:
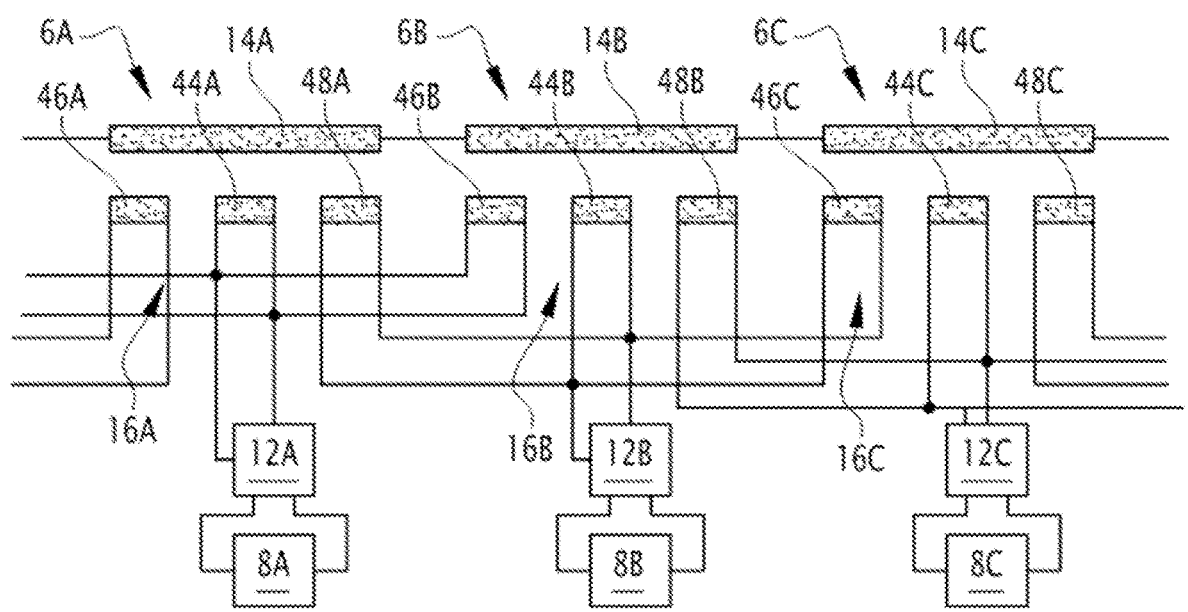
FIG. 4 is a schematic depiction of a variant of the second embodiment of an electrical supply system.

By way of example, FIG. 4 illustrates a variant of the second embodiment described above, in which each secondary induction circuit comprises three groups of windings, respectively a group of main windings 44A, 44B, 44C connected to the load, and two groups of auxiliary windings 46A, 48A; 46B, 48B; 46C, 48C.

The connections are likewise envisaged for i phases, with i being greater than or equal to 1 as in the examples of FIGS. 2 and 3, this detail having not been introduced in FIG. 4 in order to make reading this figure easier.

For a secondary induction circuit 16B of a transformer 6B, a group of output terminals of a first group of auxiliary windings 46B is connected, by a chosen multi-phase connection mode, to a group of output terminals of the group of main windings 44A of the preceding transformer 6A, and a group of output terminals of a second group of auxiliary windings 48B is connected to a group of output terminals of the group of main windings 44C of the following transformer 6C.

Of course, the embodiment described above can be generalized to a greater number of groups of auxiliary windings.

Figure 5:
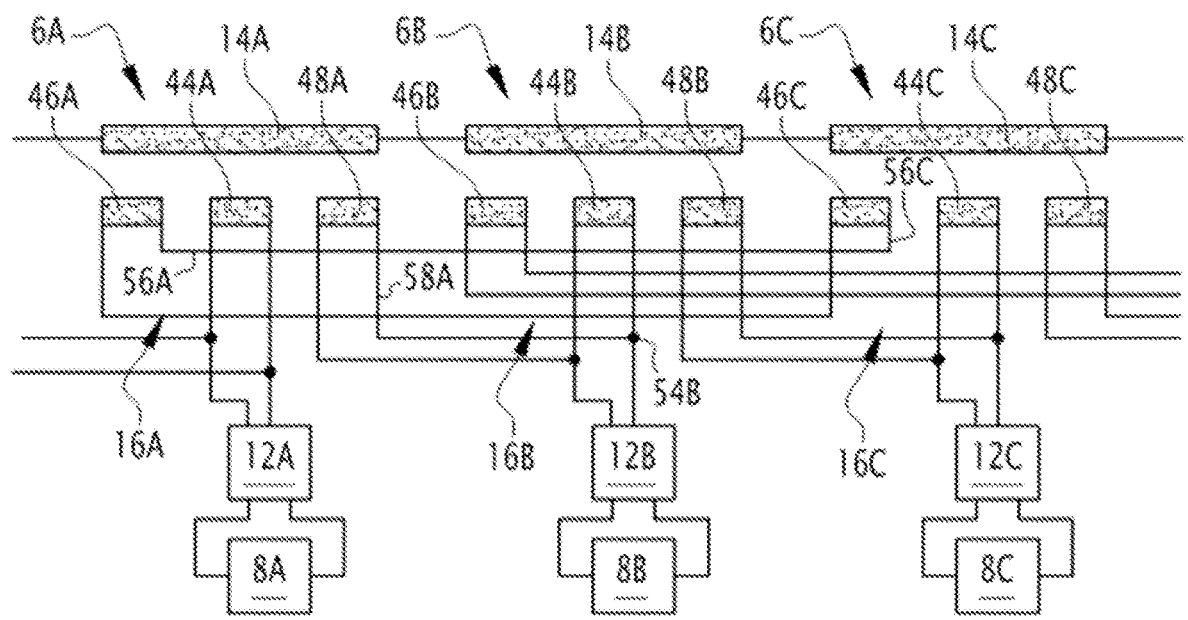
FIG. 5 is a schematic depiction of a third embodiment of an electrical supply system.

FIG. 5 illustrates a third embodiment of a power supply system according to the invention which combines the first embodiment and the second embodiment.

The connections are likewise envisaged for i phases, with i being greater than or equal to 1 as in the examples of FIGS. 2 and 3, this detail having not been introduced in the figure in order to make reading the figure easier.

In this third embodiment illustrated in FIG. 5, each secondary induction circuit 16A, 16B, 16C comprises three groups of windings, respectively a group of main windings 44A, 44B, 44C connected to the load, and two groups of auxiliary windings 46A, 48A; 46B, 48B; 46C, 48C.

A group of output terminals 54B of a group of main windings 44B is connected, via a chosen multi-phase connection mode, to the corresponding load, as well as to a group of output terminals 58A of a first group of auxiliary windings 48A of a secondary induction circuit 16A of a preceding transformer 6A in the succession of transformers.

A group of output terminals 56A of a second group of auxiliary windings 46A of a secondary induction circuit 16A of a first transformer 6A under consideration in the succession of transformers is connected to a group of terminals 56C of a second group of auxiliary windings 46C of a secondary induction circuit 16C of a third transformer 6C under consideration in the succession of transformers.

Only three transformers 6A, 6B, 6C are illustrated in FIG. 5 for readability of the figure. It is understood that a greater number of transformers can be part of a system 2, and that in this case the connections illustrated apply with transformers of successive indices n, n+1 and n+2.

Thus, a group of output terminals $54_{n+1}$ of a group of main windings of a transformer $6_{n+1}$ is connected to the corresponding load, as well as to a group of output terminals $58_n$ of a first group of auxiliary windings of a secondary induction circuit $16_n$ of a preceding transformer $6_n$ in the succession of transformers. In other words, a group of output terminals $58_n$ of a first group of auxiliary windings of a secondary induction circuit $16_n$ of a transformer is connected to the group of main windings of a following transformer $6_{n+1}$.

Likewise, a group of output terminals $56_n$ of a second group of auxiliary windings $46_n$ of a secondary induction circuit $16_n$ of a transformer $6_n$ under consideration in the succession of transformers is connected to a group of terminals $56_{n+2}$ of a second group of auxiliary windings $46_{n+2}$ of a secondary induction circuit $16_{n+2}$ of a transformer $6_{n+2}$ under consideration in the succession of transformers.

This third embodiment has a more complex architecture but combines the advantages in terms of dimensioning of the windings of the first two embodiments.

Other embodiments can be envisaged, in which a group of connection terminals of a group of auxiliary windings of a transformer of index n is connected to a group of connection terminals of a group of main or auxiliary windings of another transformer of the succession, of index n+q where q>1 for example. Thus, more complex connection systems can be envisaged, on the principle of connection outlined in the examples above.

By way of example, in a case where each secondary induction circuit comprises P groups of secondary windings, i.e. a group of main windings and P−1 groups of auxiliary windings, it is possible to consider connections, via the respective groups of terminals in the following manner: considering a transformer of index n of the succession of transformers, the first group of auxiliary windings is connected to the group of main windings of a transformer of index n+1, the second group of auxiliary windings is connected to a group of auxiliary windings of a transformer of index n+2, . . . and the P−1 group of auxiliary windings is connected to a group of auxiliary windings of a transformer of index n+P−1.

The invention claimed is:

1. An electrical supply system, suitable for supplying a plurality of separate loads from one AC power supply source, comprising at least two single-phase or multi-phase electrical transformers, each electrical transformer comprising one primary induction circuit comprising a group of primary windings, and one secondary induction circuit comprising at least one group of secondary windings,
   wherein the primary induction circuits of said transformers are connected in series forming a succession of transformers,
   and wherein, for each of the transformers, the secondary induction circuit comprises at least two groups of secondary windings, each group of secondary windings having at least one group of output terminals, each group of terminals consisting of one terminal per phase, and wherein one of said groups of output terminals is connected to at least one of the loads to be supplied, and another of said groups of output terminals is connected to one of the groups of output terminals of another transformer in the succession of transformers, so as to achieve a parallel connection of the secondary induction circuits.

2. The system according to claim 1, wherein, for each transformer, each group of secondary windings comprises windings with the same winding direction.

3. The system according to claim 1, comprising multi-phase electrical transformers, wherein for each transformer, the primary induction circuit comprises a group of primary windings comprising at least one primary winding per phase, and said primary windings are connected in series per phase.

4. The system according to claim 1, comprising multi-phase electrical transformers, wherein said connections of groups of terminals are made according to a multi-phase connection mode chosen from a star connection, a polygonal connection or a combination of these connection modes.

5. The system according to claim 1, wherein, for each transformer, the secondary induction circuit comprises a group of main windings connected to a load to be supplied, and a group of auxiliary windings comprising a group of input terminals and a group of output terminals, and wherein the terminals of the group of input terminals of each secondary induction circuit are connected in parallel, and the terminals of the group of output terminals of each secondary induction circuit are connected in parallel.

6. The system according to claim 5, wherein the terminals of the group of input terminals of each secondary induction circuit are connected, per phase, to one and the same group of conductors, and the terminals of the group of output terminals of each secondary induction circuit are connected, per phase, to one and the same group of conductors.

7. The system according to claim 1, wherein, for each transformer, the secondary induction circuit comprises a group of main windings connected to a load to be supplied, and a group of auxiliary windings, each group of windings having a group of input terminals and a group of output terminals, each terminal of the group of input terminals of a group of auxiliary windings being connected, per phase, to a terminal of the group of input terminals of the group of main windings of the secondary induction circuit of a following or preceding transformer of the succession of transformers, and each terminal of the group of output terminals of a group of auxiliary windings being connected, per phase, to a terminal of the group of output terminals of said group of main windings.

8. The system according to claim 1, the system comprising at least three electrical transformers, wherein each electrical transformer comprises a secondary induction circuit comprising at least three groups of secondary windings, comprising a group of main windings connected to a load to be supplied, and two groups of auxiliary windings, each group of auxiliary windings having a group of input terminals and a group of output terminals, and wherein a first group of auxiliary windings of a secondary induction circuit of a transformer is connected in parallel, via said groups of input and output terminals, to a group of main windings of a following or preceding transformer of the succession of transformers.

9. The system according to claim 8, wherein, for a transformer under consideration of index n of the succession of transformers, the group of output terminals of the first group of auxiliary windings is connected to the group of output terminals of the group of main windings of a transformer of index n+1 in the succession of transformers, and the group of output terminals of the second group of auxiliary windings is connected to the group of output terminals of a second group of auxiliary windings of a transformer of index n+2 in the succession of transformers.

10. The system according to claim 1, further comprising an AC-to-DC converter connected between a group of secondary windings and a load to be supplied.

* * * * *